United States Patent
Wickstrom

(10) Patent No.: US 12,498,138 B2
(45) Date of Patent: Dec. 16, 2025

(54) HVAC LOW VOLTAGE COMPONENTS AND WIRING IDENTIFICATION SYSTEM

(71) Applicant: Alexander Wickstrom, Lake Havasu City, AZ (US)

(72) Inventor: Alexander Wickstrom, Lake Havasu City, AZ (US)

( * ) Notice: Subject to any disclaimer, the term of this patent is extended or adjusted under 35 U.S.C. 154(b) by 234 days.

(21) Appl. No.: 18/542,882

(22) Filed: Dec. 18, 2023

(65) Prior Publication Data
US 2024/0302070 A1    Sep. 12, 2024

Related U.S. Application Data

(60) Provisional application No. 63/489,595, filed on Mar. 10, 2023.

(51) Int. Cl.
| | |
|---|---|
| *F24F 11/88* | (2018.01) |
| *F24F 11/526* | (2018.01) |
| *F24F 11/56* | (2018.01) |
| *G08B 7/00* | (2006.01) |

(52) U.S. Cl.
CPC ............ *F24F 11/88* (2018.01); *F24F 11/526* (2018.01); *F24F 11/56* (2018.01); *G08B 7/00* (2013.01)

(58) Field of Classification Search
CPC .......... F24F 11/88; F24F 11/526; F24F 11/56; F24F 11/30; F24F 11/52; G08B 7/00
See application file for complete search history.

(56) References Cited

U.S. PATENT DOCUMENTS

| | | | |
|---|---|---|---|
| 5,839,654 A | * | 11/1998 | Weber .................. F24F 11/88 |
| | | | 236/47 |
| 7,434,744 B2 | | 10/2008 | Garozzo |
| 7,444,251 B2 | | 10/2008 | Nikovski |
| 7,704,463 B2 | | 4/2010 | Willette |

(Continued)

OTHER PUBLICATIONS

J. M. Anderson, R. W. Cox, P. K. Parikh and C. R. Laughman, "Improving the efficiency of residential HVAC systems using computer-based power-electronic controls," 2008 11th Workshop on Control and Modeling for Power Electronics, Zurich, Switzerland, 2008, pp. 1-6. (Year: 2008).*

(Continued)

*Primary Examiner* — Adnan Aziz
(74) *Attorney, Agent, or Firm* — Brennan, Manna & Diamond, LLC

(57) ABSTRACT

A HVAC low voltage components identification system. The system comprises a sender unit positioned within the HVAC system and a transceiver unit designed as a handheld device. The sender unit, manufactured as a compact and lightweight device, is connected to the low voltage power supply of the HVAC system, and generates a predetermined signal or frequency. This signal is transmitted through the low voltage supply of the HVAC system and produces an Electromagnetic field (EMF) enabling the identification and location of low voltage components within the HVAC system. The transceiver unit, equipped with an EMF sensor, detects the transmitted signal, and provides visual and audio feedback to indicate the presence of low voltage components. Professionals can efficiently locate and work with low voltage wiring and components in HVAC systems by utilizing the HVAC low voltage components identification system.

20 Claims, 5 Drawing Sheets

(56) References Cited

U.S. PATENT DOCUMENTS

| | | | |
|---|---|---|---|
| 8,368,337 B2 | 2/2013 | Bonilla | |
| 10,923,868 B2 | 2/2021 | Shultz | |
| 11,435,106 B2* | 9/2022 | Steiner | G06T 19/006 |
| 2004/0133314 A1 | 7/2004 | Ehlers | |
| 2010/0188245 A1* | 7/2010 | Nielsen | G01V 3/15 |
| | | | 340/686.1 |
| 2010/0253511 A1* | 10/2010 | Nielsen | G01V 3/15 |
| | | | 340/539.32 |
| 2013/0249794 A1* | 9/2013 | Hutcheson | G06F 3/033 |
| | | | 345/157 |
| 2017/0364106 A1* | 12/2017 | Smith | G05D 23/306 |
| 2018/0259206 A1* | 9/2018 | Uselton | H04B 3/542 |
| 2019/0064857 A1* | 2/2019 | Metselaar | G05D 23/19 |
| 2019/0384334 A1* | 12/2019 | Warren | H02J 3/14 |
| 2020/0370777 A1* | 11/2020 | Kabler | F24F 11/38 |

OTHER PUBLICATIONS

Rajagopal Niranjini, Rowe Anthony, Giri Suman, and Berges Mario, "Demo abstract: A magnetic field-based appliance metering system," IPSN 2013—Proceedings of the 12th International Conference on Information Processing in Sensor Networks, Part of CPSWeek 2013 (2013), pp. 307-308, 3refs. (Year: 2013).*

* cited by examiner

HVAC LOW VOLTAGE COMPONENTS AND WIRING IDENTIFICATION SYSTEM

CROSS-REFERENCE TO RELATED APPLICATION

The present application claims priority to, and the benefit of, U.S. Provisional Application No. 63/489,595, which was filed on Mar. 10, 2023 and is incorporated herein by reference in its entirety.

FIELD OF THE INVENTION

The present invention generally relates to the field of HVAC systems. More specifically, the present invention relates to a novel system for detecting components, such as the correct condensing unit, furnace, air handler, thermostat or control module, for purposes of complete system identification, as well as locating low voltage components and wiring in an HVAC system. The system includes a sender unit positioned within the HVAC system and a transceiver unit designed as a handheld device. The system works upon detection of Electromagnetic field (EMF) by the transceiver unit wherein the EMF is produced by a signal generated by the sender unit. Accordingly, the present disclosure makes specific reference thereto. Nonetheless, it is to be appreciated that aspects of the present invention are also equally applicable to other like applications, devices, and methods of manufacture.

BACKGROUND

By way of background, low voltage wires and components are an integral part of HVACR (Heating, Ventilation, Air Conditioning and Refrigeration) systems. Such components are used to transmit signals and control functions within the system. Common low voltage components are thermostats, control boards, relays, sensors, and low voltage wiring. Generally, identifying low voltage wires and components in HVAC systems is important for troubleshooting and maintenance of conventional HVAC and HVACR systems. However, correctly detecting and identifying system components, as well as low voltage wires and components in different HVAC systems at homes and business areas can be challenging for both amateurs and professionals.

Commonly, homes, retail stores, offices, and other establishments have multiple HVAC systems. Each system may have its own set of low voltage wires and components making it difficult for individuals to identify such low voltage wires and components. Further, within an HVAC system, there can be multiple components that look similar, especially related to low voltage wiring. It is challenging for technicians to differentiate between various wires and components without proper identification or labeling. Conventionally, professionals and technicians rely on manual checking of HVAC systems using testing tools such as voltmeters, ammeters, and more to correctly identify low voltage wire and components. For example, to identify the location of low voltage components and wiring, a technician makes repeated back-and-forth trips between a thermostat and HVAC system. This is not only time consuming and painstaking but also ineffective and without a clear identification system, technicians are required to resort to trial and error to identify the correct low voltage wire or component.

Current ways of identifying low voltage wire or component are also not safe and can be hazardous for individuals. Individuals desire an improved system and method for easier identification of specific low voltage HVAC components.

Therefore, there exists a long felt need in the art for a system that allows users to both detect and identify system components, as well as identifying low voltage HVAC components in residential settings, commercial settings, and more. There is also a long felt need in the art for an HVAC low voltage components identification system that allows technicians to quickly identify specific locations of low voltage components and wires. Additionally, there is a long felt need in the art for a system that obviates manual inspection of an HVAC system for identifying low voltage components and wires. Moreover, there is a long felt need in the art for an HVAC low voltage components identification system that is safer, easier, and quicker. Further, there is a long felt need in the art for a system that obviates the need for repeated back-and-forth trips between the thermostat and HVAC system. Furthermore, there is a long felt need in the art for an HVAC low voltage components identification system that gives an indication in the form of a visual or audible notification to a user of location of a low voltage component and/or wiring. Finally, there is a long felt need in the art for a system that saves time, enhances efficiency, and reduces the potential for errors in identifying low voltage wires and components in HVAC and HVACR systems.

The subject matter disclosed and claimed herein, in one embodiment thereof, comprises a HVAC low voltage components and wiring identification system. The system features a compact sender unit positioned within a HVAC device, the sender unit is configured for generating a predetermined signal or frequency, the sender unit is connected to a low voltage power supply within the HVAC system, enabling the transmission of the predetermined signal or frequency through the low voltage supply of the HVAC system, a handheld transceiver unit external to the HVAC system, the transceiver unit including an electromagnetic field (EMF) sensor for detecting the EMF produced by the transmitted signal or frequency, indicator lights on the transceiver unit providing visual feedback to a technician, with a specific light pattern indicating the presence or absence of low voltage components in the vicinity of the transceiver unit based on the detected EMF.

In this manner, the HVAC low voltage components identification system of the present invention accomplishes all of the forgoing objectives and provides users with a sender unit installed within an HVAC system and a handheld transceiver unit designed to receive voltage transmission signals via EMF from a low voltage component and/or wire to identify the low voltage components and their location. The system helps to pinpoint the desired component and thus saves time, enhances efficiency, and reduces the potential for errors.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an HVAC low voltage component and wiring identification system. The system further comprising a sender unit designed to be positioned in a HVAC device, the sender unit including a housing made of waterproof, electrostatic-resistant heavy-duty plastic (though other durable materials can also be used including, without limitation, metal), the housing has an embedded or attached magnet for secure placement inside the HVAC unit, the sender unit including a first alligator-style clip which is electrically connected to a low voltage power supply of the HVAC unit, providing electrical energy for activating the sender unit, a second alligator-style clip configured to send a signal for identifying and locating low voltage HVAC components, and a third alligator-style clip providing a proper grounding connection. The system also includes a handheld transceiver unit having an electromagnetic field (EMF) sensor for detecting a low voltage signal transmitted by the sender unit positioned in the HVAC system, one or more indicator LEDs indicating the presence of a low voltage component or wiring in the HVAC system in the vicinity of the transceiver unit.

In a further embodiment, a HVAC low voltage components identification system is disclosed. The system includes a sender unit positioned within a HVAC device, the sender unit is configured for generating a predetermined signal or frequency, a low voltage power supply within the HVAC system, to which the sender unit is connected, enabling the transmission of the predetermined signal or frequency through the low voltage supply of the HVAC system, a transceiver unit external to the HVAC system, the transceiver unit including an electromagnetic field (EMF) sensor for detecting the EMF produced by the transmitted signal or frequency, indicator lights on the transceiver unit providing visual feedback to a technician, with a specific light pattern indicating the presence or absence of low voltage components in the vicinity of the transceiver unit based on the detected EMF, and a rechargeable battery within the transceiver unit supplying power to the transceiver unit during operation.

In yet another embodiment, a method for identifying low voltage wiring and components in a HVAC device is described. The method comprising the steps of positioning a sender unit at one or more locations within the HVAC system, preferably near low voltage wiring or components, connecting the sender unit to a low voltage power supply and the low voltage circuit of the HVAC system, wherein the sender unit) receives power from the low voltage power supply, generating a predetermined signal or frequency using the sender unit, utilizing the low voltage power supply within the HVAC system, transmitting the generated signal or frequency through the low voltage supply of the HVAC system, utilizing the existing low voltage wiring as a conduit, detecting the electromagnetic field (EMF) generated by the transmitted signal using a transceiver unit, which is an EMF detector or sensor, and moving the transceiver unit around the HVAC system, bringing the receiver closer to (i.e., proximal to) the low voltage wiring and components, to observe changes in the EMF readings and identify the presence of low voltage wiring and components.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
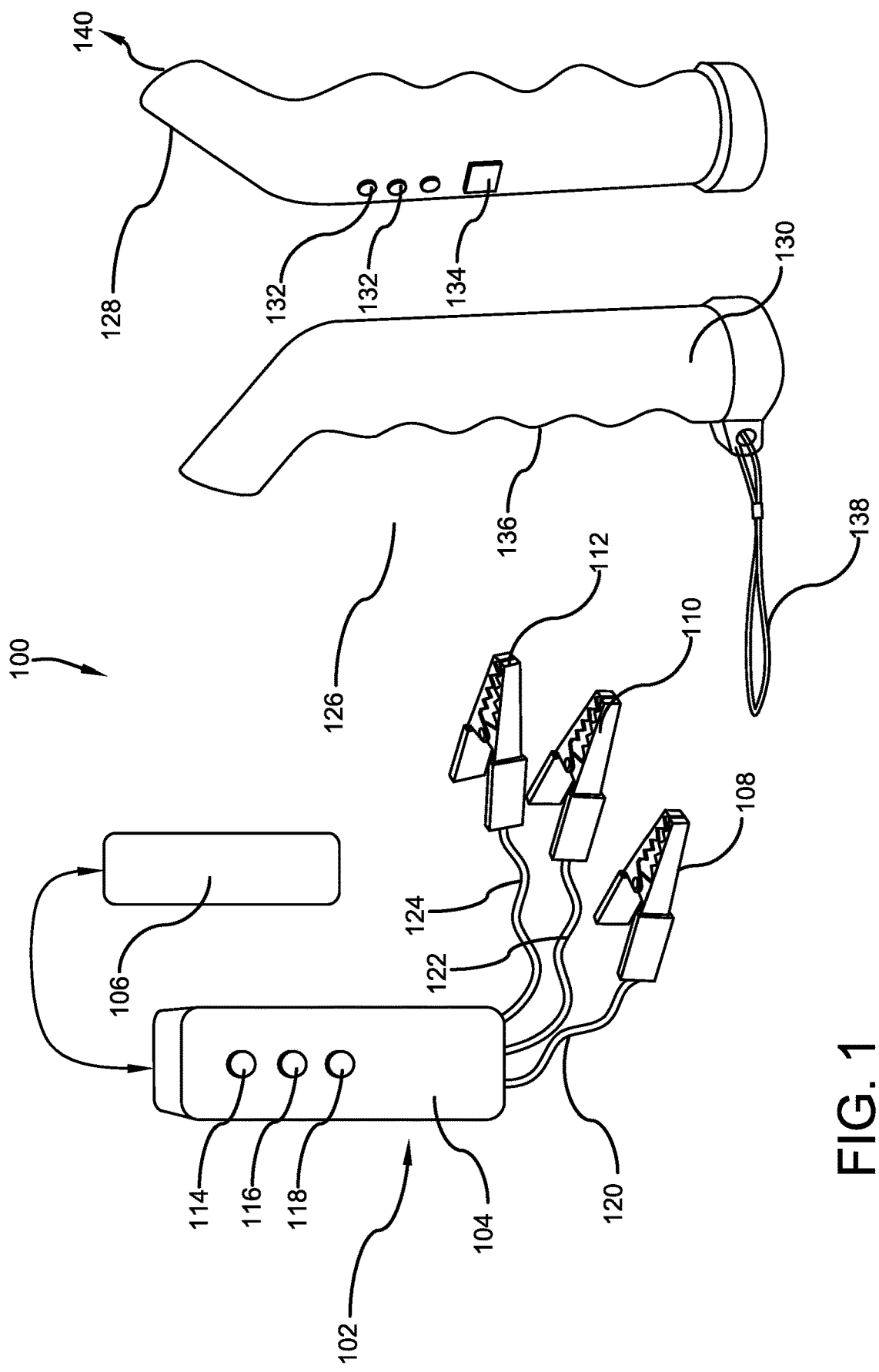
FIG. 1 illustrates a perspective view of HVAC low voltage components identification system of the present invention in accordance with one embodiment.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a system that allows users with an identification for low voltage HVAC components in residential settings, commercial settings, and more. There is also a long felt need in the art for an HVAC low voltage components identification system that allows technicians to quickly identify specific locations of low voltage components and wires. Additionally, there is a long felt need in the art for a system that obviates manual inspection of an HVAC system for identifying low voltage components and wires. Moreover, there is a long felt need in the art for an HVAC low voltage components identification system that is safer, easier, and quicker. Further, there is a long felt need in the art for a system that obviates the need for repeated back-and-forth trips between the thermostat and HVAC system. Furthermore, there is a long felt need in the art for an HVAC low voltage components identification system that gives an indication in the form of any visual or audible notification to a user of location of a low voltage component and/or wiring. Finally, there is a long felt need in the art for a system that saves time, enhances efficiency, and reduces the potential for errors in identifying low voltage wires and components in HVAC and HVACR systems.

The present invention, in one exemplary embodiment, is a method for identifying low voltage wiring and components in an HVAC system. The method uses EMF generated by a low voltage signal passing through low voltage components and including the steps of positioning a portable sender unit at one or more locations within the HVAC system, connecting the sender unit to a low voltage power supply and the low voltage circuit of the HVAC system, wherein the sender unit) receives power from the low voltage power supply, generating a predetermined signal or frequency using the sender unit, utilizing the low voltage power supply within the HVAC system, transmitting the generated signal or frequency through the low voltage supply of the HVAC system, utilizing the existing low voltage wiring as a conduit, detecting the electromagnetic field (EMF) generated by the transmitted signal using a transceiver unit, which is an EMF detector or sensor, and moving the transceiver unit around the HVAC system, bringing the receiver closer to (i.e., proximal to) the low voltage wiring and components, to observe changes in the EMF readings and identify the presence of low voltage wiring and components.

Figure 2:
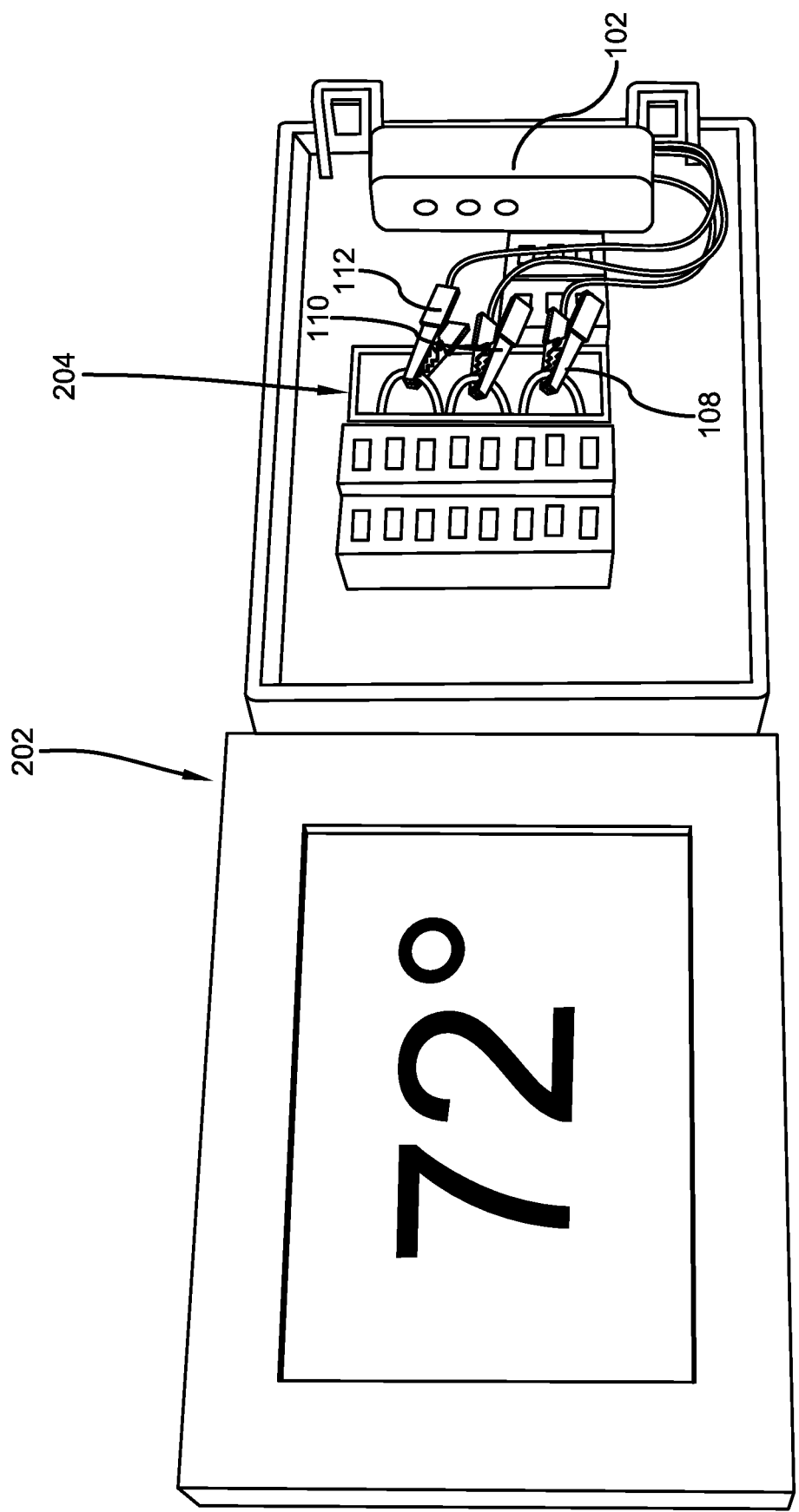
FIG. 2 illustrates a perspective view showing the sender device installed within a thermostat of an HVAC system for generating a signal to detect low voltage component or wiring in accordance with the disclosed architecture.
Figure 3:
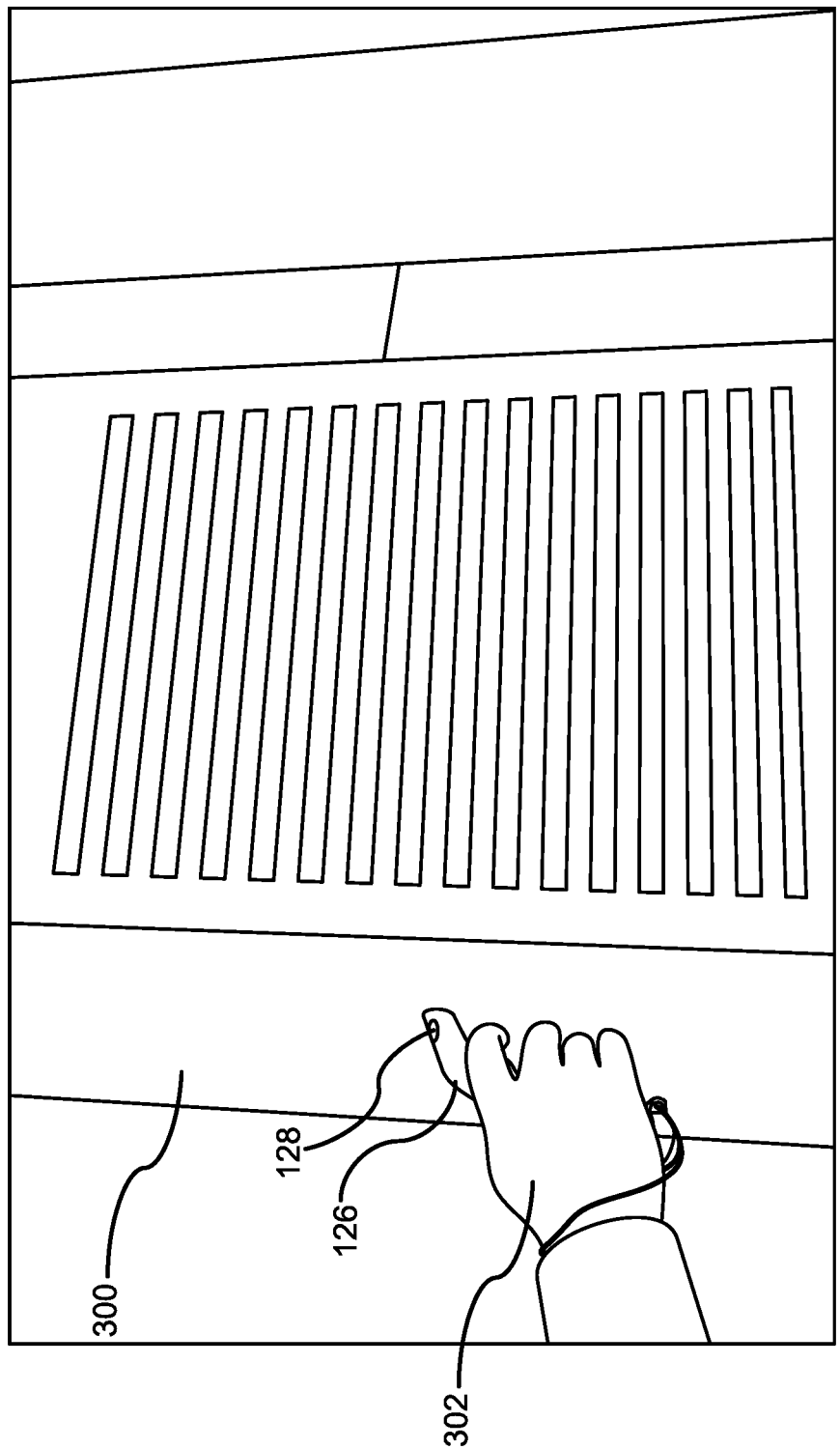
FIG. 3 illustrates a perspective view showing the transceiver device is in use for detecting a low voltage component or wiring in a HVAC device in accordance with the disclosed architecture.
Figure 4:
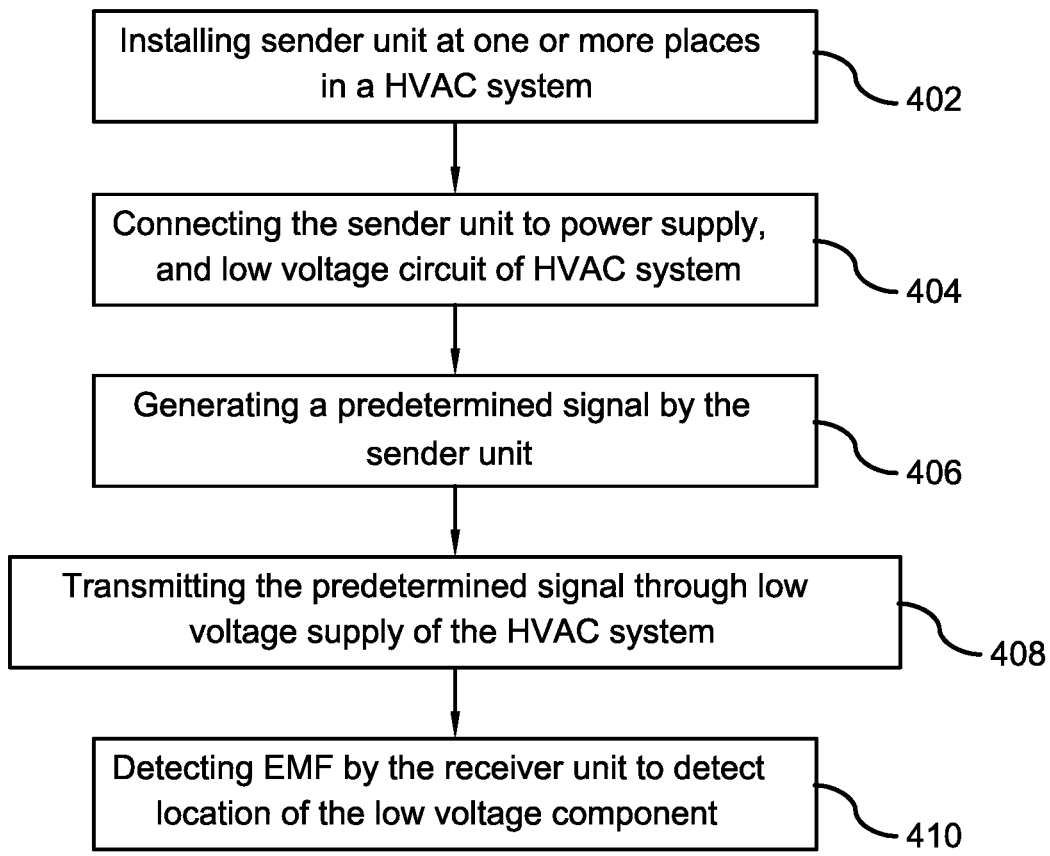
FIG. 4 illustrates a flow diagram depicting a process of locating low voltage components and wiring in a HVAC or HVACR system using the system of the present invention in accordance with the disclosed architecture.

Referring initially to the drawings, FIG. 1 illustrates a perspective view of the HVAC low voltage components identification system of the present invention in accordance with one embodiment. The HVAC low voltage components identification system 100 includes a sender unit 102 designed to be positioned in a HVAC device as illustrated in FIGS. 2-4. The sender unit 102 is manufactured as a compact and lightweight device and the housing 104 of the sender unit 102 includes an embedded or attached magnet 106 for secure placement inside the HVAC unit. The housing 104 is waterproof, electrostatic-resistant, and can be made from heavy-duty plastic. More specifically, the sender unit 102 includes a first alligator-style clip 108 for electrically connecting to low voltage power supply of the HVAC unit as illustrated in FIG. 2. The first alligator-style clip 108 provides the necessary electrical energy for the sender unit 102 to activate. A second alligator-style clip 110 is configured to send a signal for identifying and locating low voltage HVACR components.

The sender unit 102 is configured to send a signal or frequency along the HVAC circuit to identify location of one or more low voltage components and wiring as described later in the disclosure. A third alligator-style clip 112 is configured for providing a proper grounding connection. The third alligator-style clip 112 as a result helps in protecting the sender unit 102 against electrical shocks and clip 112 also reduces the risk of electrical fires. The third alligator-style clip 112 also reduces electrical noise, interference, and voltage fluctuations that can affect the proper functioning of the sender unit 102. The clips 108, 110, 112 are internally coupled to electronic components 114, 116, 118 of the sender unit 102 using the wires 120, 122, 124 respectively for enabling the sender unit 102 to generate a signal or frequency to locate a low voltage component or wiring.

Figure 5:
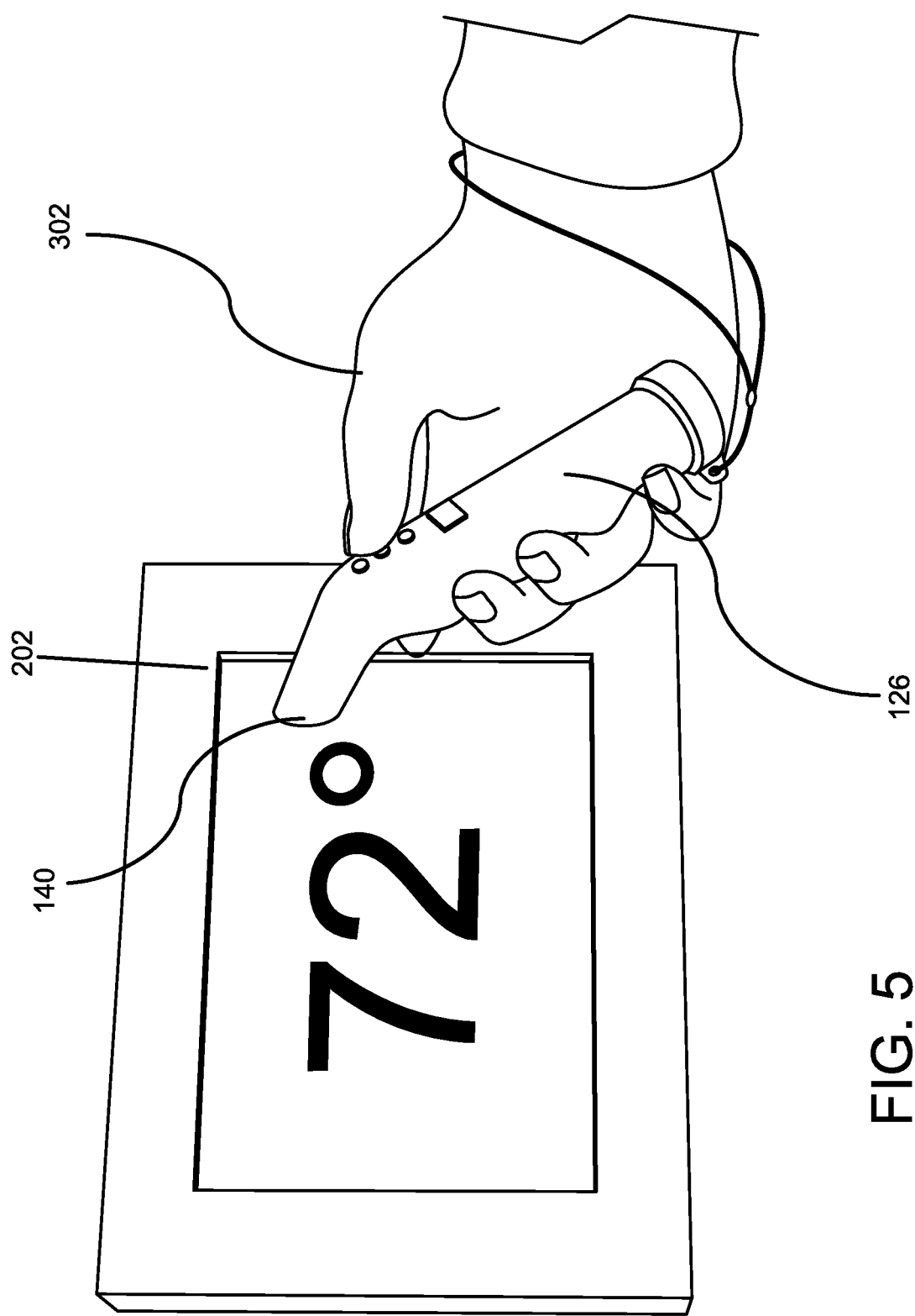
FIG. 5 illustrates the transceiver device placed near the sender device installed in a thermostat to identify low voltage in accordance with the disclosed architecture.

The HVAC low voltage components identification system 100 includes a transceiver unit 126 which is designed as a handheld device and can be made from a plastic material. The transceiver unit 126 includes an Electromagnetic field (EMF) sensor 128 for detecting the signal transmitted by the sender unit 102. The transceiver unit 126 detects EMF at a position external to the HVAC unit as illustrated in FIGS. 3 and 5, for detecting location of a low voltage component or wiring. The transceiver unit 126 includes a rechargeable battery 130 for providing electrical energy to the transceiver unit 126.

Transceiver unit 126 includes one or more indicator LEDs 132 for indicating presence of a low voltage component or wiring in vicinity of the transceiver unit 126. The LED indicator light 132 may blink in RED color when no low voltage component is detected and may blink in GREEN color on detecting a low voltage component or wiring, thus, providing an alert to a technician of location of low voltage component or wiring. In the preferred embodiment, the transceiver unit 126 includes a speaker 134 for providing audio notifications to a user about the presence of a low voltage component or wiring in an HVAC system. For easy gripping of the transceiver unit 126, an ergonomic gripping surface 136 is disposed in the transceiver unit 126 and further, a loophole or attachment point 138 is included in the transceiver unit 126 for easy carrying by a user.

In use, for detecting a low voltage component or wiring of an HVAC system, the top end 140 of the transceiver unit 126 is positioned near the target HVAC area for optimum detection of the EMF produced by the signal generated by the sender unit 102 as described later in the disclosure.

FIG. 2 illustrates a perspective view showing the sender device installed within a thermostat of an HVAC system for generating a signal to detect low voltage component or wiring in accordance with the disclosed architecture. The sender unit or device 102 can be installed at any position within an HVAC system and more preferably, near the low voltage components of the HVAC system. As illustrated, the sender unit 102 is installed inside the thermostat 202 of an HVAC system using the magnet or can be installed using any other fastener such as a clip which can be integrated to the sender unit 102.

The sender unit 102 is coupled to the low voltage power supply 204 of the thermostat 202 using the first alligator-style clip 108. The internal electronic components (not shown) of the sender device 102 are powered using the low voltage power supply of the HVAC system powering the thermostat 202. Similarly, the second alligator-style clip 110 is connected to the electric circuit of the HVAC system enabling transmission of the generated signal by the sender unit 102 along the low voltage electric circuit of the HVAC system. It should be noted that the sender unit 102 is not visible from outside as the sender unit 102 is installed inside the HVAC system and therefore, does not obstruct aesthetics of the system and further, does not obstruct conventional working and power supply.

The sender unit 102 is required to be connected to the low voltage power supply in a manner that allows the sender unit 102 to generate a predetermined signal or frequency and transmit it through the power supply of the HVAC system. Further, the exact placement of the sender unit 102 within the HVAC system can depend on the specific requirements, the desired signal transmission range, and the accessibility of the low voltage wiring.

FIG. 3 illustrates a perspective view showing the transceiver device is in use for detecting a low voltage component or wiring in a HVAC device in accordance with the disclosed architecture. The EMF detector transceiver device 126 can be held in a hand 302 by a user and is moved closer to the HVAC system 300. The EMF detector transceiver device 126 includes the EMF sensor 128 which is configured to detect the EMF produced by the signal generated by the sender unit 102 for determining location of a low voltage component or wiring. The transceiver device 126 is a compact device and therefore, can reach hard-to-reach areas and further, obviates manual inspection of the circuits of the system 300.

As described in FIG. 1, by moving the EMF detector 126 closer to (i.e., proximal to) the low voltage wiring and components, technicians can detect the presence and strength of the transmitted signal generated by the sender unit 102. The visual indicators 132 and speaker 134 can alert a technician about the detected EMF and thus, location of low voltage wiring and components.

FIG. 4 illustrates a flow diagram depicting a process of locating low voltage components and wiring in a HVAC or HVACR system using the system 100 of the present invention in accordance with the disclosed architecture. Initially, the sender unit 102 is positioned at one or more locations within the HVAC system (Step 402). The specific placement of the sender unit 102 can depend on the desired coverage and accessibility to the low voltage circuitry of the HVAC system. In the preferred embodiments, the sender unit 102 is installed near the low voltage wiring or components such as a thermostat and control board. Then, the sender unit 102 is connected to the power supply and the low voltage circuit of the HVAC system (Step 404). The sender unit 102 is configured to receive power from the low voltage power supply within the HVAC system.

Once the sender unit 102 is connected to the power supply and low voltage circuit, the sender unit 102 utilizes the low voltage power supply to generate a predetermined signal or frequency (Step 406). It should be noted that the specific method used to generate the signal can depend on the design and electronics of the sender unit 102. The signal is designed to be distinct than conventional electric supply and identifiable using the EMF transceiver unit 126. Thereafter, the generated signal is transmitted through the low voltage supply of the HVAC system (Step 408). The sender unit 102 utilizes the existing low voltage wiring of the HVAC system as a conduit for signal transmission. The signal travels through the wiring and reaches various low voltage components connected to the HVAC system. Finally, the transceiver unit 126 which is an EMF detector or sensor, detects the electromagnetic field (EMF) generated by the transmitted signal (Step 410). Technicians can move the transceiver unit 126 around the HVAC system, bringing the unit 126 closer to (i.e., proximal to) the low voltage wiring and components to observe changes in the EMF readings and thus, detecting low voltage wiring and components.

FIG. 5 illustrates the transceiver device placed near the sender device installed in a thermostat to identify low voltage in accordance with the disclosed architecture. As described above, the sender unit 102 is installed near the low voltage wiring or components such as a thermostat and control board. As illustrated, the transceiver unit 126 is positioned near vicinity of the thermostat 202 in which the sender unit 102 is installed. The transceiver unit 126 detects the EMF of the signal generated by the sender unit 102 to locate the low voltage component or wiring within an HVAC system.

It should be appreciated that using the low voltage electrical components and wiring identification system 100, technicians can use the handheld transceiver unit 126 to detect the transmitted signal of the sender unit 102 and pinpoint the desired component, eliminating the need for repeated back-and-forth trips between the thermostat and HVAC system. This streamlined process saves time, enhances efficiency, and reduces the potential for errors in identifying low voltage wires and components.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "HVAC low voltage components identification system", "low voltage components identification system", and "low voltage electrical components and wiring identification system" are interchangeable and refer to the HVAC and HVACR low voltage components and wiring identification system 100 of the present invention.

Notwithstanding the forgoing, the HVAC and HVACR low voltage components and wiring identification system 100 of the present invention can be of any suitable size and configuration as is known in the art without affecting the overall concept of the invention, provided that it accomplishes the above stated objectives. One of ordinary skill in the art will appreciate that the HVAC and HVACR low voltage components and wiring identification system 100 as shown in the FIGS. are for illustrative purposes only, and that many other sizes and shapes of the HVAC and HVACR low voltage components and wiring identification system 100 are well within the scope of the present disclosure. Although the dimensions of the HVAC and HVACR low voltage components and wiring identification system 100 are important design parameters for user convenience, the HVAC and HVACR low voltage components and wiring identification system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A HVAC components identification system comprising:
a HVAC low voltage components identification (ID) device having a sender unit positioned in a HVAC unit and a transceiver unit;
wherein said sender unit having a first clip for electrically connecting to a low voltage power supply of the HVAC unit, a second clip for sending a signal for identifying and locating low voltage HVACR components of the HVAC unit; and a third clip for providing a grounding connection;

wherein said first clip coupled to a first electronic component, said second clip coupled to a second electronic component, and said third clip coupled to a third electronic component for said sender unit to generate a signal along an HVAC circuit to identify location of one or more low voltage components in the HVAC unit;

said sender unit generates a signal to locate a low voltage component in the HVAC unit;

wherein said transceiver unit having an EMF sensor for detecting said signal transmitted by said sender unit at a position external to the HVAC unit for detecting a location of the low voltage HVACR components of the HVAC unit; and further wherein said transceiver unit having a plurality of LEDs for indicating presence of the low voltage HVACR components proximal to said transceiver unit.

2. The HVAC components identification system of claim 1, wherein at least one of said plurality of LEDs blinks in RED color when the low voltage HVACR components not detected and blinks in GREEN color when the low voltage HVACR components detected to provide alert of location of the low voltage HVACR component.

3. The HVAC components identification system of claim 2, wherein said transceiver unit having a speaker for providing an audio notification of location of the low voltage HVACR component.

4. The HVAC components identification system of claim 3, wherein said first clip provides electrical energy for actuating said sender unit.

5. The HVAC components identification system of claim 4, wherein said transceiver unit is a handheld unit including an ergonomic gripping surface.

6. The HVAC components identification system of claim 5, wherein said transceiver unit having a rechargeable battery for providing electrical energy to said transceiver unit.

7. The HVAC components identification system of claim 6, wherein said sender unit having a housing including an embedded magnet for secure placement inside the HVAC unit.

8. The HVAC components identification system of claim 7, wherein said housing is waterproof and electrostatic-resistant.

9. The HVAC components identification system of claim 7, wherein said first electronic component is a low voltage power supply of the HVAC unit.

10. The HVAC components identification system of claim 9, wherein said sender unit is powered by the low voltage power supply of the HVAC unit.

11. The HVAC components identification system of claim 9, wherein said second electronic component is a low voltage electric circuit of the HVAC system for transmission of said signal by said sender unit along the low voltage electric circuit of the HVAC system.

12. A HVAC components identification system comprising:
  a HVAC low voltage components identification (ID) device having a sender unit positioned in a HVAC unit and a transceiver unit;
  wherein said sender unit having a first clip for electrically connecting to a low voltage power supply of the HVAC unit, a second clip for sending a signal for identifying and locating low voltage HVACR components of the HVAC unit; and a third clip for providing a grounding connection;
  wherein said first clip coupled to a first electronic component, said second clip coupled to a second electronic component, and said third clip coupled to a third electronic component for said sender unit to generate a signal along an HVAC circuit to identify location of one or more low voltage components in the HVAC unit;
  said sender unit generates a signal to locate a low voltage component in the HVAC unit;
  wherein said transceiver unit having an EMF sensor for detecting said signal transmitted by said sender unit at a position external to the HVAC unit for detecting a location of the low voltage HVACR components of the HVAC unit;
  wherein said transceiver unit having a plurality of LEDs for indicating presence of the low voltage HVACR components proximal to said transceiver unit;
  wherein said first electronic component is a low voltage power supply of the HVAC unit;
  wherein said sender unit is powered by the low voltage power supply of the HVAC unit; and
  further wherein said second electronic component is a low voltage electric circuit of the HVAC system for transmission of said signal by said sender unit along the low voltage electric circuit of the HVAC system.

13. The HVAC components identification system of claim 12, wherein at least one of said plurality of LEDs blinks in RED color when the low voltage HVACR components not detected and blinks in GREEN color when the low voltage HVACR components detected to provide alert of location of the low voltage HVACR component.

14. The HVAC components identification system of claim 13, wherein said transceiver unit having a speaker for providing an audio notification of location of the low voltage HVACR component.

15. The HVAC components identification system of claim 14, wherein said first clip provides electrical energy for actuating said sender unit.

16. The HVAC components identification system of claim 15, wherein said transceiver unit is a handheld unit including an ergonomic gripping surface.

17. A method for detecting a low voltage component in a HVAC unit, the method comprising the steps of:
  mounting a HVAC low voltage components identification (ID) device having a sender unit inside a HVAC unit, wherein said sender unit having a first clip for electrically connecting to a low voltage power supply of the HVAC unit, a second clip for sending a signal for identifying and locating low voltage components of the HVAC unit, and a third clip for providing a grounding connection, and further wherein said first clip coupled to a first electronic component, said second clip coupled to a second electronic component, and said third clip coupled to a third electronic component for said sender unit to generate a signal along an HVAC circuit to identify location of the low voltage components in the HVAC unit;
  generating a signal from said sender unit to locate the low voltage components of the HVAC unit;
  providing a transceiver unit having an EMF sensor for detecting said signal transmitted by said sender unit at a position external to the HVAC unit for detecting a location of the low voltage components of the HVAC unit;
  detecting said signal proximal to said sender unit;
  indicating presence of the low voltage components of the HVAC unit proximal to said transceiver unit with at least one LED alert on said transceiver unit, wherein said first electronic component is a low voltage power supply of the HVAC unit;

powering said sender unit by the low voltage power supply of the HVAC unit; and transmitting said signal by said sender unit.

18. The method for detecting a low voltage component in a HVAC unit of claim 17 wherein said second electronic component is a low voltage electric circuit of the HVAC system, and further wherein said transmitting said signal is along the low voltage electric circuit of the HVAC system.

19. The method for detecting a low voltage component in a HVAC unit of claim 17 further comprising a step of mounting said sender unit proximal to the low voltage components of the HVAC unit.

20. The method for detecting a low voltage component in a HVAC unit of claim 17, wherein said transceiver unit having a speaker for providing an audio notification of location of the low voltage components of the HVAC unit.

* * * * *